United States Patent [19]

Neveux

[11] 4,036,288
[45] July 19, 1977

[54] RADIATOR, ESPECIALLY FOR THE AIR-CONDITIONING SYSTEM OF AN AUTOMOBILE

[75] Inventor: Rene Neveux, Les Clayes-sous-Bois, France

[73] Assignee: Societe Anonyme Francaise du Ferodo, Paris, France

[21] Appl. No.: 594,620

[22] Filed: July 10, 1975

[30] Foreign Application Priority Data

July 10, 1974 France .................................. 74.23998

[51] Int. Cl.² .......................... F28D 1/04; F28D 7/00; F28F 1/30; F28F 9/00
[52] U.S. Cl. ..................................... 165/69; 165/149; 165/151; 237/12.3 B
[58] Field of Search ................... 165/149, 151, 69, 82, 165/76; 237/12.3 B

[56] References Cited

U.S. PATENT DOCUMENTS

| | | | |
|---|---|---|---|
| 1,869,338 | 7/1932 | Ihde | 165/149 |
| 3,437,133 | 4/1969 | Bullard | 165/149 |
| 3,610,324 | 10/1971 | Davidson et al. | 165/69 |
| 3,858,291 | 1/1975 | Perpall | 165/69 X |

*Primary Examiner*—Carroll B. Dority, Jr.
*Assistant Examiner*—Sheldon Richter

[57] ABSTRACT

Radiator for an air-conditioning system of an automobile.

The stack of fins for the heating of the circulating air is traversed by tubes in which circulates hot water. The fins are rectangular and their small edges are folded according to an obtuse angle. A band of foam material surrounds the stack along the edges of the folds and along the end fins. The band comprises holes which are traversed by the tubes protruding from the end fins.

The band is wider than the small edge of the fins and the parts of the band projecting from the stack of fins contribute to the tightness of the mounting of the radiator on the conduit provided for the air to be conditioned.

3 Claims, 4 Drawing Figures

Fig. 2
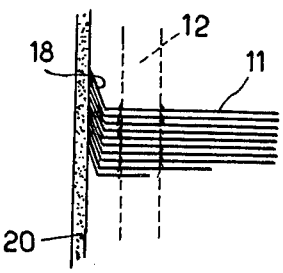
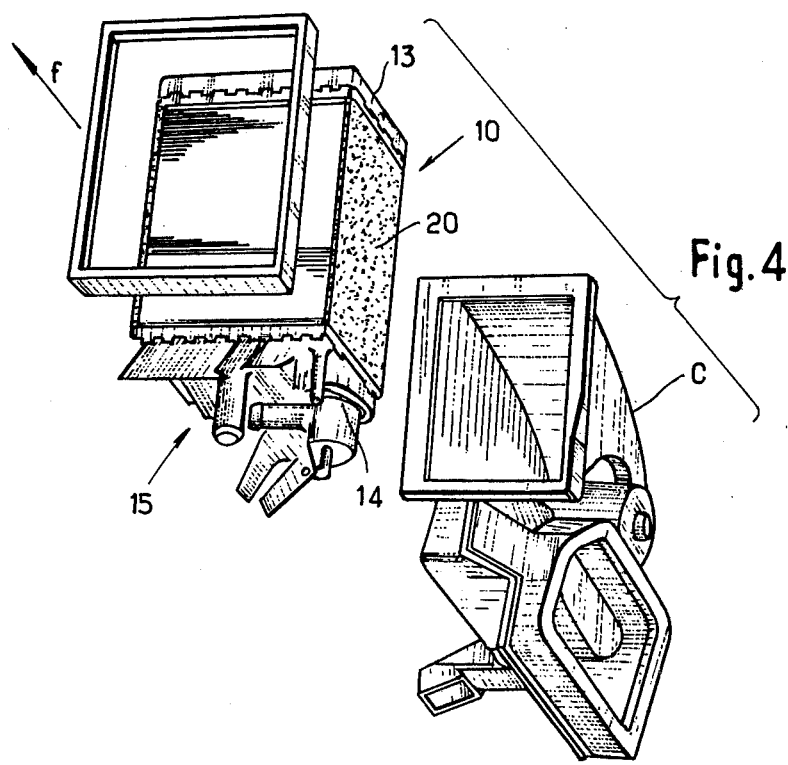
Fig. 4

RADIATOR, ESPECIALLY FOR THE AIR-CONDITIONING SYSTEM OF AN AUTOMOBILE

The invention has for its object an improved radiator and particularly and such a radiator adapted to be used in an air-conditioning system of an automobile.

Radiators are already known which comprise a stack of fins traversed by tubes in which circulates a primary fluid, such as hot water, and which are placed in a circulation conduit for a secondary fluid, generally air, which travels through the radiator parallel to the fins and therefore perpendiculrly to the primary fluid tubes. To prevent the secondary flux from tending to flow around the radiator, a tight seal is applied around the inlet face in contact with the air circulation conduit. Placing and keeping the seal in place are often awkward; the radiator has to be adapted so as to hold it, making construction more complex, and special means are also needed on the air circulation conduit.

It is an object of the invention to provide an improved radiator which considerably simplifies the mounting of the seal required at the junction of the air inlet face with the conduit fitted to the radiator.

It is also an object of the invention to provide an improved radiator that does not need special adaptation to hold the seal nor special means on the conduit so that it can be kept in place.

According to the invention, the radiator which comprises a stack of fins traversed by tubes in which circulates a primary fluid, such as hot water, and also traversed by a secondary fluid like air, parallelly to said fins and perpendicularly to said tubes, with a seal for mounting the radiator to an air circulation conduit is characterized in that said seal is made of a band of material such as foam rubber or the like applied against the edges of the fins, said band being incorporated to the radiator during manufacture thereof and being held in place by inserting the ends of the tubes which project from the fins into holes of corresponding design provided in said band.

The latter is advantageously made of a foam rubber of polyurethane closed cell foam type material, the width of the band being equal or slightly superior to the size of the fins measured parallely to the direction of the secondary fluid circulating though the radiator.

In a preferred embodiment the band of a foam rubber or similar type material applied against the edges of the fins and incorporated to the radiator during manufacture thereof passes between the manifolds and the water tanks of the radiator.

The invention will be well understood from the following description, made by way of example, with reference to the attached drawing wherein:

FIG. 2 is a partial view illustrating the application of the seal band to the edges of the fins in an improved radiator according to the invention;

FIG. 3 is a schematic perspective view illustrating the manufacture of an improved radiator according to the invention;

FIG. 4 is a schematic perspective view showing the mounting of an improved radiator according to the invention in an air-conditioning system;

Figure 1:
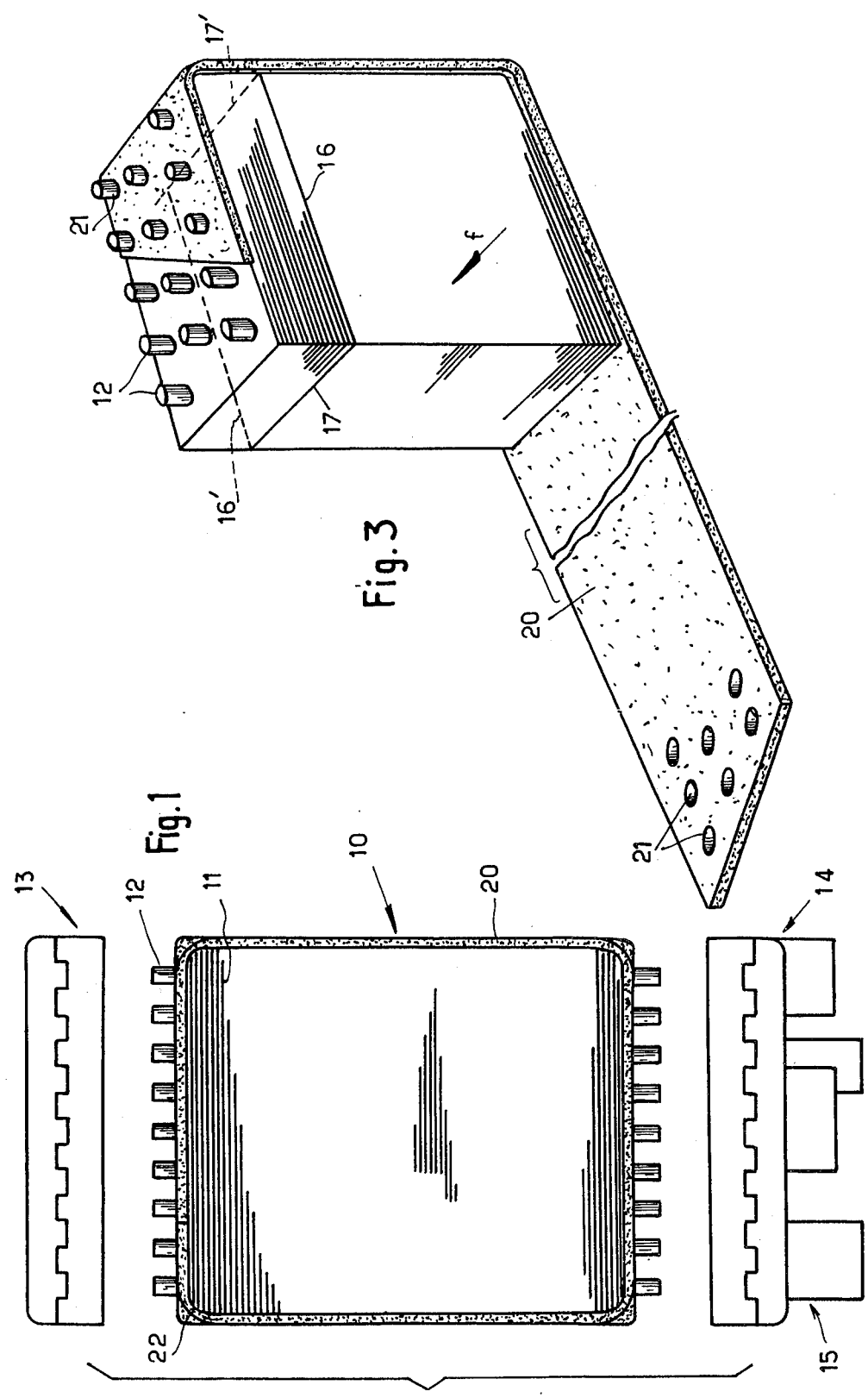
FIG. 1 is a broken away elevation view of an improved radiator according to the invention.

A radiator 10, FIGS. 1 and 4, comprises a stack of fins 11 traversed by tubes 12 in which circulates a primary fluid, such as hot water, and ending at both water tanks 13 and 14, respectively. Tank 14 is fitted, as known, with means shown schematically at 15 to connect the radiator with a circuit controlling the flow of the primary fluid in the tubes 12.

In the embodiment described and illustrated, the fins 11 are rectangular in contour, with large edges 16,16' and small edges 17, 17', the latter being folded back as shown in FIG. 2 according to folds 18 set side by side and overlapping to form "partitions" on the lateral faces of the radiator not carrying the tans. The partitions contribute to a certain extent to canalize the air flow directed on radiator 10 by a feed conduit C in the direction of arrow $f$ FIG. 4. These partitions do not prevent, however, the passage of air between the radiator and its surrounding wall.

According to the invention, tightness between the radiator and its surrounding wall is achieved by means of a band 20 equal or slightly superior in width to the length of the sides 17, 17' and which, chosen to have as tightness characteristics, is applied against sides 17, 17' of the fins 11.

Band 20 is, for example, in foam rubber or polyurethane foam with closed cells, or similar material.

It is fixed to the radiator by means of the tubes 12. This is achieved by cutting the band to a length slightly less than the perimeter of a longitudinal section of the stack of fins and providing therein holes 21 arranged to match the tube design in the radiator. As shown in FIG. 3, part of the holes 21 of one end of the band, —which may be slant cut—, are placed on the ends of tubes 12, projecting from the stack of fins, then the band is applied onto the edges 17', slightly stretched if necessary. The holes in the middle of the band are then fitted to the other ends of the tubes 12 and the remainder of the band is sealed against the edges 17 of the fins when the other holes 21 are fitted onto the ends of the tubes 12 mentioned firstand not yet lined with the band 20. Tanks 13 and 14 are then applied to the stack of fins fitted with band 20 to constitute a radiator comprising at the end of its manufacture, a seal adapted to its mounting in an air-condintioning system.

If the width of strip 20 is slightly greater to the length of the edges 17, 17' of the fins, and given the flexibility of its material, the band may projecting in relation to the stack of fins, forming small rounded frills at the corners and all along the perimeter, as shown in 22, FIG. 1, increasing the tightness of the mounting, which can be carried out directly, without auxiliary seals, on the conduit C of the air-conditioning system which the radiator according to the invention is designed to equip.

I claim:

1. A radiator adapted to be used in the air conditioning system of an automotive vehicle having water tanks and an air duct, the radiator comprising a plurality of tubes extending between said water tanks, a stack of fins affixed to and traversed by said tubes, means for connecting said water tanks to a circuit of primary fluid circulating through said tubes, means for circulating a secondary fluid through said stack of fins in a direction substantially prallel to said fins and thus substantially perpendicular to said tubes, and a gasket for the air tight mounting of the radiator within said air duct of said air conditioning sytem, said gasket being made of a single flat band of foam material applied against the edges of said fins, having a width at least equal to that of the dimension of the fins measured parallel to the direction of flow of said secondary fluid through the radiator, the length of said band being at most equal to the perimeter of a longitudinal section of the stack of fins, said band being applied onto said fins with a slight tension and having holes through which the end portions of the tubes protrude with respect to the stack of fins to maintain said band in position with respect to said fins.

2. A radiator according to claim 1, wherein the band is made of a material chosen in the group consisting of foam rubber and closed cell polyurethane foam.

3. A radiator according to claim 1 wherein said band comprises holes having a shape corresponding to the cross-sectional shape of the tubes, whereby said band is affixed to the radiator by the end of the tubes protruding from said stack of fins and extending through said holes.

* * * * *